United States Patent
Iqbal et al.

(10) Patent No.: US 10,431,860 B2
(45) Date of Patent: Oct. 1, 2019

(54) COLD PLATE ASSEMBLY FOR ELECTRIFIED VEHICLE BATTERIES

(71) Applicant: FORD GLOBAL TECHNOLOGIES, LLC, Dearborn, MI (US)

(72) Inventors: Asif Iqbal, Macomb, MI (US); Daniel Miller, Dearborn, MI (US); James Lawrence Swoish, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 713 days.

(21) Appl. No.: 14/628,603

(22) Filed: Feb. 23, 2015

(65) Prior Publication Data

US 2016/0248133 A1    Aug. 25, 2016

(51) Int. Cl.
*H01M 10/6556* (2014.01)
*H01M 10/613* (2014.01)
*H01M 10/625* (2014.01)
*H01M 10/6568* (2014.01)

(52) U.S. Cl.
CPC ..... *H01M 10/6556* (2015.04); *H01M 10/613* (2015.04); *H01M 10/625* (2015.04); *H01M 10/6568* (2015.04); *H01M 2220/20* (2013.01)

(58) Field of Classification Search
CPC ........... H01M 10/6556; H01M 10/613; H01M 10/625
See application file for complete search history.

(56) References Cited

U.S. PATENT DOCUMENTS

| 8,231,996 B2 | 7/2012 | Howard et al. | |
| 2009/0142653 A1* | 6/2009 | Okada | H01M 2/1077 429/120 |
| 2012/0107663 A1* | 5/2012 | Burgers | F28F 3/06 429/120 |
| 2012/0237805 A1* | 9/2012 | Abels | H01M 2/1077 429/83 |
| 2013/0192807 A1 | 8/2013 | DeKeuster | |
| 2014/0072855 A1* | 3/2014 | Schaefer | H01M 2/1072 429/120 |
| 2014/0322582 A1 | 10/2014 | Ruter et al. | |
| 2015/0207187 A1* | 7/2015 | Beltz | H01M 10/613 165/181 |
| 2016/0164148 A1* | 6/2016 | Yum | H01M 10/613 429/120 |

FOREIGN PATENT DOCUMENTS

| CN | 103443953 A | 12/2013 |
| CN | 203423237 U | 2/2014 |
| FR | 2998098 A1 | 5/2014 |
| WO | 2014162939 A1 | 10/2014 |

OTHER PUBLICATIONS

Notification of First Office Action, Chinese Application No. 201610070863.5 dated Mar. 8, 2019.

* cited by examiner

*Primary Examiner* — Jonathan G Jelsma
(74) *Attorney, Agent, or Firm* — Carlson, Gaskey & Olds

(57) ABSTRACT

An assembly according to an exemplary aspect of the present disclosure includes, among other things, a top plate piece, a bottom plate piece and tubing sandwiched between the top plate piece and the bottom plate piece.

14 Claims, 4 Drawing Sheets

COLD PLATE ASSEMBLY FOR ELECTRIFIED VEHICLE BATTERIES

TECHNICAL FIELD

This disclosure relates to a battery assembly for an electrified vehicle. The battery assembly includes a cold plate assembly having takeout tubing that extends along a linear axis away from an edge of the cold plate assembly.

BACKGROUND

The need to reduce automotive fuel consumption and emissions is well known. Therefore, vehicles are being developed that reduce or completely eliminate reliance on internal combustion engines. Electrified vehicles are one type of vehicle being developed for this purpose. In general, electrified vehicles differ from conventional motor vehicles because they are selectively driven by battery powered electric machines. Conventional motor vehicles, by contrast, rely exclusively on the internal combustion engine to propel the vehicle.

High voltage battery assemblies are employed to power the electric machines of electrified vehicles. The battery assemblies include battery arrays constructed of a plurality of battery cells. An enclosure assembly houses the battery arrays. A cold plate may be placed in contact with the battery cells to thermally manage the heat generated by the battery cells.

SUMMARY

An assembly according to an exemplary aspect of the present disclosure includes, among other things, a top plate piece, a bottom plate piece and tubing sandwiched between the top plate piece and the bottom plate piece.

In a further non-limiting embodiment of the foregoing assembly, portions of both the top plate piece and the bottom plate piece overlap the tubing.

In a further non-limiting embodiment of either of the foregoing assemblies, each of the top plate piece and the bottom plate piece include flared portions that overlap the tubing.

In a further non-limiting embodiment of any of the foregoing assemblies, the tubing extends along a linear axis away from an edge of the assembly.

In a further non-limiting embodiment of any of the foregoing assemblies, the linear axis extends between the top plate piece and the bottom plate piece.

In a further non-limiting embodiment of any of the foregoing assemblies, the top plate piece and the bottom plate piece cooperate to establish a body of a cold plate assembly.

In a further non-limiting embodiment of any of the foregoing assemblies, an extension extends from the body, the tubing received by the extension.

In a further non-limiting embodiment of any of the foregoing assemblies, the extension includes a platform connected to the body by a bridge, the platform elevated relative to the body.

In a further non-limiting embodiment of any of the foregoing assemblies, the top plate piece includes a first flared portion and the bottom plate piece includes a second flared portion, the tubing received within an opening between the first flared portion and the second flared portion.

In a further non-limiting embodiment of any of the foregoing assemblies, a passage is formed between the top plate piece and the bottom plate piece.

In a further non-limiting embodiment of any of the foregoing assemblies, the passage is a serpentine passage.

In a further non-limiting embodiment of any of the foregoing assemblies, a portion of the tubing that is received between the top plate piece and the bottom plate piece extends along a linear axis that is parallel with at least a portion of the passage.

In a further non-limiting embodiment of any of the foregoing assemblies, the tubing includes an inlet tube and an outlet tube.

A battery assembly according to another exemplary aspect of the present disclosure includes, among other things, a plurality of battery cells, an enclosure assembly that houses the plurality of battery cells and a cold plate assembly in contact with the plurality of battery cells. Tubing of the cold plate assembly protrudes through a wall of the enclosure, the tubing extending along a linear axis away from an edge of a body of the cold plate assembly.

In a further non-limiting embodiment of the foregoing assembly, the linear axis excludes any bends.

In a further non-limiting embodiment of either of the foregoing assemblies, the body includes an extension and the tubing extends from the extension.

In a further non-limiting embodiment of any of the foregoing assemblies, the body includes a flared portion and the tubing is received within an opening established by the flared portion.

In a further non-limiting embodiment of any of the foregoing assemblies, the body is established by a top plate piece and a bottom plate piece, the tubing sandwiched between the top plate piece and the bottom plate piece.

In a further non-limiting embodiment of any of the foregoing assemblies, the cold plate assembly is part of a thermal management system that includes a fluid source, an inlet and an outlet.

In a further non-limiting embodiment of any of the foregoing assemblies, the tubing includes an inlet tube connected to the inlet and an outlet tube connected to the outlet.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details an assembly for an electrified vehicle. The assembly may be a battery assembly that includes a cold plate assembly for thermally managing heat generated by battery cells of the battery assembly. The cold plate assembly may include a top plate piece, a bottom plate piece and tubing sandwiched between the top plate piece and the bottom plate piece such that portions of the top plate piece and the bottom plate piece overlap the tubing. In some embodiments, the tubing extends laterally from an edge of the cold plate assembly along a linear axis. The assemblies of this disclosure utilize "straight" takeout tubing configurations that provide a robust joint between the tubing and the plate during assembly, shipping and handling, and installation. Although described herein with respect to a battery cold plate assembly, this disclosure is not limited to such an embodiment and could extend to any assembly that requires a robust joint between tubing and another part. These and other features are discussed in greater detail in the following paragraphs of this detailed description.

Figure 1:
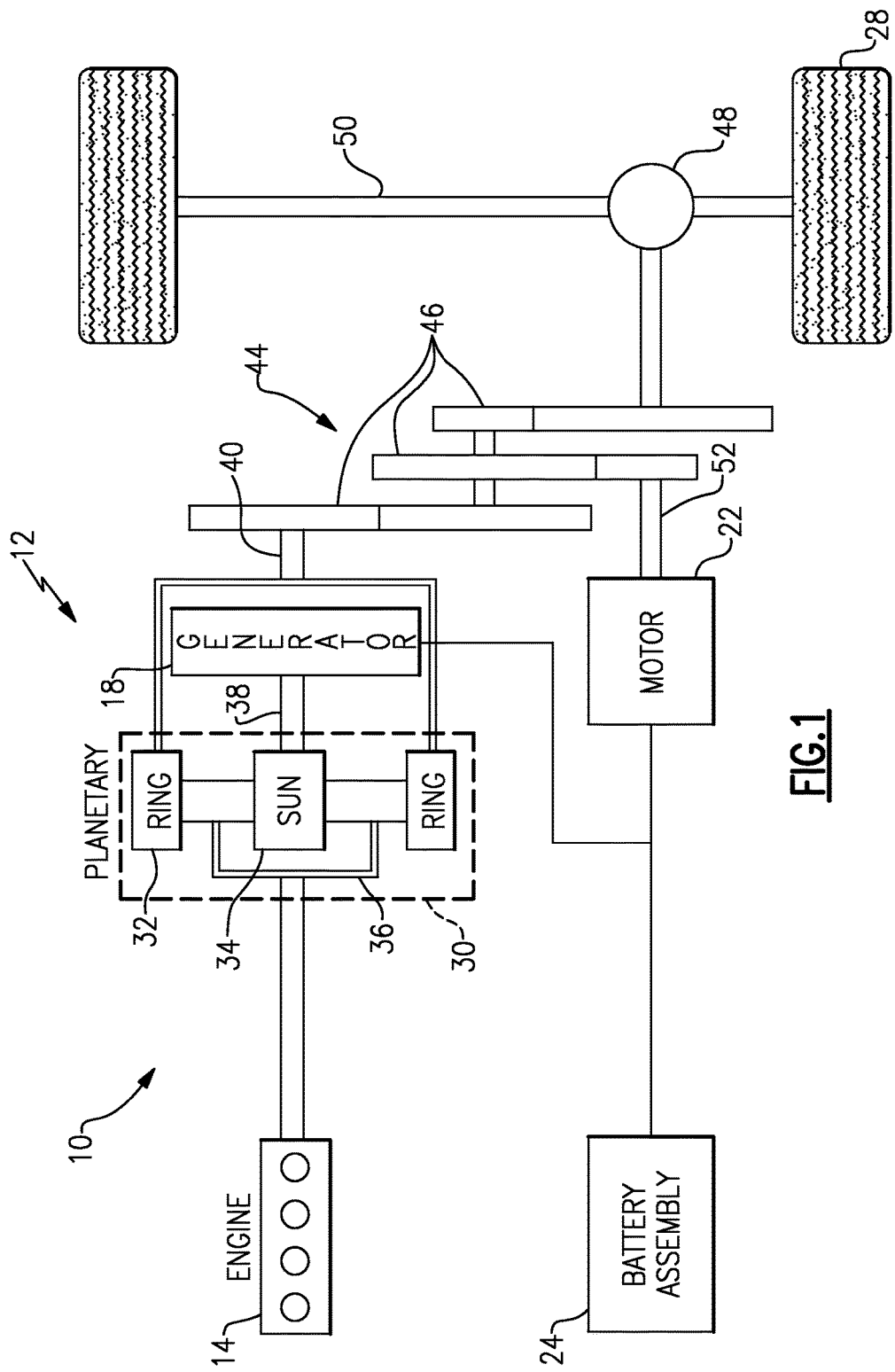
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's) and battery electric vehicles (BEV's).

In one embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery assembly 24. In this example, the second drive system is considered an electric drive system of the powertrain 10. The first and second drive systems generate torque to drive one or more sets of vehicle drive wheels 28 of the electrified vehicle 12. Although a power-split configuration is shown, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery assembly 24.

The battery assembly 24 is an example type of electrified vehicle battery. The battery assembly 24 may include a high voltage traction battery pack that includes a plurality of battery arrays, or groupings of battery cells, capable of outputting electrical power to operate the motor 22 and the generator 18. Other types of energy storage devices and/or output devices can also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery assembly 24 state of charge up to its maximum allowable discharging rate under certain driving patterns/cycles. The EV mode is an example of a charge depleting mode of operation for the electrified vehicle 12. During EV mode, the state of charge of the battery assembly 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery assembly 24 at a constant or approximately constant level by increasing the engine 14 propulsion usage. The electrified vehicle 12 may be operated in other operating modes in addition to the EV and HEV modes within the scope of this disclosure.

Figure 2:
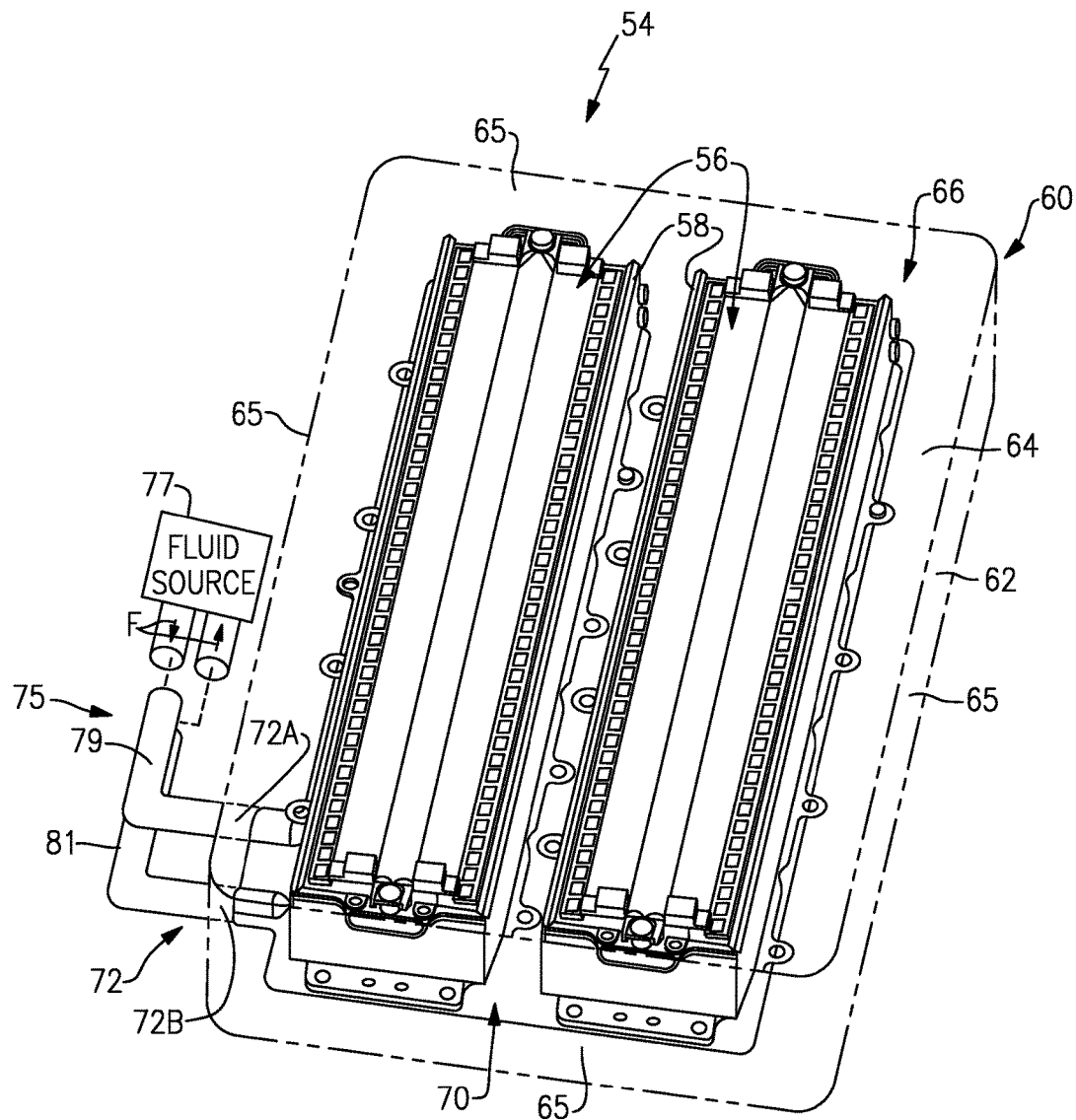
FIG. 2 illustrates a battery assembly of an electrified vehicle.

FIG. 2 illustrates a battery assembly 54 that can be incorporated into an electrified vehicle. For example, the battery assembly 54 could be employed within the electrified vehicle 12 of FIG. 1. The battery assembly 54 includes battery arrays 56, which can be described as groupings of battery cells, for supplying electrical power to various vehicle components. Although two battery arrays 56 are illustrated in FIG. 2, the battery assembly 54 could include a single battery array or multiple battery arrays within the scope of this disclosure. In other words, this disclosure is not limited to the specific configuration shown in FIG. 2.

Each battery array 56 includes a plurality of battery cells 58 that may be stacked side-by-side along a span length of each battery array 56. Although not shown in the highly schematic depiction of FIG. 2, the battery cells 58 are electrically connected to one another using busbar assemblies. In one embodiment, the battery cells 58 are prismatic, lithium-ion cells. However, battery cells having other geometries (cylindrical, pouch, etc.) and/or other chemistries (nickel-metal hydride, lead-acid, etc.) could alternatively be utilized within the scope of this disclosure.

An enclosure assembly 60 (shown in phantom in FIG. 2) surrounds the battery arrays 56. The enclosure assembly 60 defines an interior 66 for housing the battery arrays 56 and, potentially, any other components of the battery assembly 54. In one non-limiting embodiment, the enclosure assembly 60 includes a tray 62 and a cover 64 which establish a plurality of walls 65 that surround the interior 66. The enclosure assembly 60 may take any size, shape or configuration, and is not limited to the specific configuration of FIG. 2.

During some conditions, heat may be generated by the battery cells 58 of the battery arrays 56 during charging and discharging operations. Heat may also be transferred into the battery cells 58 during vehicle key-off conditions as a result of relatively hot ambient conditions. During other conditions, such as relatively cold ambient conditions, the battery cells 58 may need heated. A thermal management system 75 may therefore be utilized to thermally condition (i.e., heat or cool) the battery cells 58.

The thermal management system 75, for example, may include a fluid source 77, an inlet 79, an outlet 81 and a cold plate assembly 70. In one embodiment, the inlet 79 and the outlet 81 connect between the fluid source 77 and the cold plate assembly 70 and may include tubes, hoses, pipes or the like. A fluid F, such as glycol or some other suitable fluid, is communicated from the fluid source 77 to the inlet 81, through tubing 72 of the cold plate assembly 70, and then through the cold plate assembly 70. The fluid F is circulated through the cold plate assembly 70, which is in contact with one or more surfaces of the battery cells 58, to either add or remove heat to/from the battery assembly 54. In other words, the fluid F may enhance the heat transfer effect achieved by the cold plate assembly 70. The fluid F may then be discharged through the tubing 72 into the outlet 81 before returning to the fluid source 77. Because the fluid F either picks up heat from the battery cells 58 or loses heat to the battery cells 58, the fluid F exiting through the outlet 81 will likely have a different temperature than the fluid F entering through the inlet 79.

In one non-limiting embodiment, the battery arrays 56 of the battery assembly 54 are positioned atop the cold plate assembly 70 so that the cold plate assembly 70 is in contact with a bottom surface of each battery cell 58. The tubing 72 of the cold plate assembly 70 protrudes through the enclosure assembly 60. For example, the tubing 72 may protrude through one of the walls 65 of the enclosure assembly 60 for connection to the inlet 79 and outlet 81 of the thermal management system 75.

Figure 3:
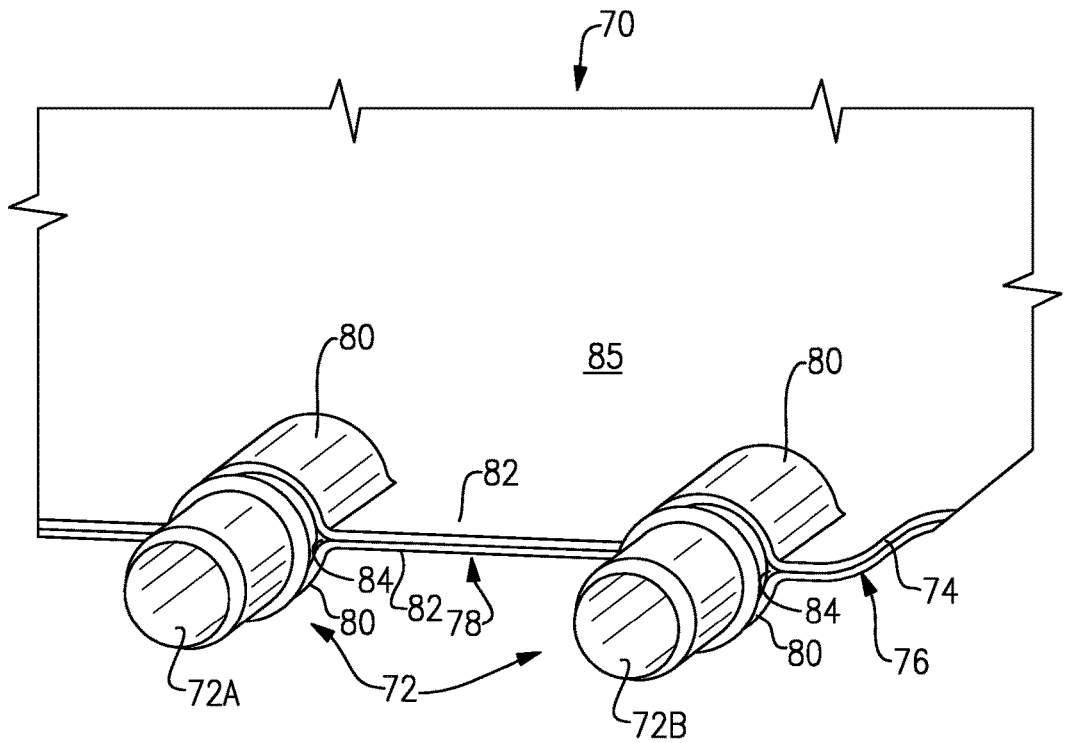
FIG. 3 illustrates a cold plate assembly according to a first embodiment of this disclosure.
Figure 4:
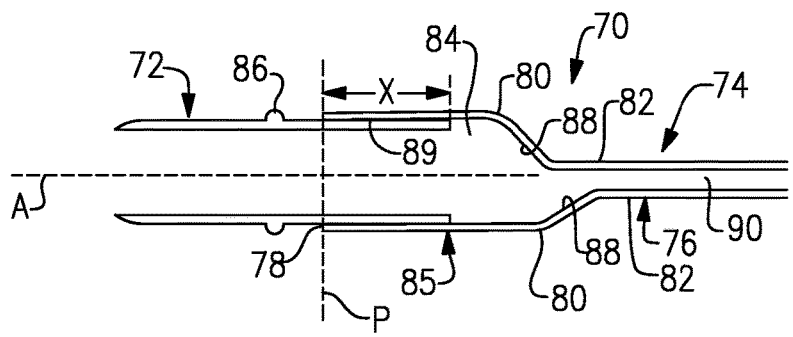
FIG. 4 illustrates a cross-sectional view of the cold plate assembly of FIG. 3.

FIGS. 3 and 4 further illustrate the cold plate assembly 70. In one embodiment, the cold plate assembly 70 includes a top plate piece 74, a bottom plate piece 76 and the tubing 72. In other embodiments, the cold plate assembly 70 may include but a single plate piece (see, for example, FIG. 6). The top plate piece 74 and the bottom plate piece 76 together establish a body 85 of the cold plate assembly 70. In one embodiment, the top plate piece 74 and bottom plate piece 76 are made of a thermally conductive material such as, for example, a metallic material.

The tubing 72, which may include an inlet tube 72A and an outlet tube 72B, is sandwiched between the top plate piece 74 and the bottom plate piece 76 such that the body 85 of the cold plate assembly 70 overlaps the tubing 72. The inlet tube 72A may connect to the inlet 79 of the thermal management system 75 and the outlet tube 72B may connect to the outlet 81 (see FIG. 2). In one embodiment, the tubing 72 extends laterally away from an edge 78 of the body 85 of the cold plate assembly 70.

Portions of each of the top plate piece 74 and the bottom plate piece 76 may overlap the tubing 72. For example, the top plate piece 74 and the bottom plate piece 76 may overlap the tubing 72 by a distance X (see FIG. 4). The distance X of the overlap is sufficient to provide a robust joint for securing the tubing 72 to the top plate piece 74 and the bottom plate piece 76. In one embodiment, the tubing 72 is brazed to the top plate piece 74 and the bottom plate piece 76. However, other attachment methodologies are also contemplated.

In another embodiment, the top plate piece 74 and the bottom plate piece 76 include flared portions 80 that jut outwardly from body portions 82. The flared portions 80 may extend from the edge 78 of the body 85 into the body portions 82 of each of the top plate piece 74 and the bottom plate piece 76. The tubing 72 may be inserted into openings 84 that extend between the flared portions 80 of the top plate piece 74 and the bottom plate piece 76.

Referring now to FIG. 4, the tubing 72 of the cold plate assembly 70 may extend along a linear axis A. The linear axis A extends laterally away from the edge 78 of the body 85 of the cold plate assembly 70 at a location between the top plate piece 74 and the bottom plate piece 76. In one embodiment, the linear axis A is completely linear (i.e., contains no bends) and is perpendicular to a plane P that extends through the edge 78. The tubing 72 may include a flange 86 that controls the insertion distance of the tubing 72 into openings 84. The insertion distance of the tubing 72 may also be partially controlled by inner walls 88 of the flared portions 80 of the top plate piece 74 and the bottom plate piece 76.

Figure 5:
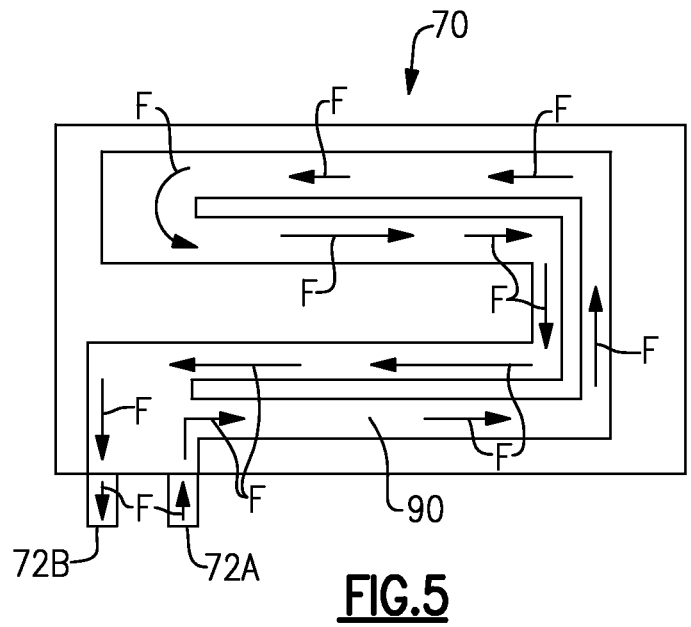
FIG. 5 illustrates a passage for circulating fluid through a cold plate assembly.

FIG. 5 illustrates additional features of the cold plate assembly 70. For example, the cold plate assembly 70 may optionally include a passage 90. The passage 90 establishes a conduit for circulating the fluid F through the cold plate assembly 70. The passage 90 may be established by the top plate piece 74, the bottom plate piece 76, or both (see, for example, FIG. 4). In one non-limiting embodiment, the passage 90 is a serpentine passage. The passage 90 receives the fluid F from the inlet tube 72A and discharges the fluid F into the outlet tube 72B. In another embodiment, a portion 89 of the tubing 72 that is received between the top plate piece 74 and the bottom plate piece 76 extends along a linear axis A that is parallel with at least a portion of the passage 90.

Although FIGS. 3, 4 and 5 illustrate a cold plate assembly, this disclosure is not limited to such an embodiment. Indeed, it should be appreciated that any vehicle assembly that requires a robust joint between tubing and another part, such as a plate having a plenum and a cover, may benefit from the teachings of this disclosure.

Figure 6:
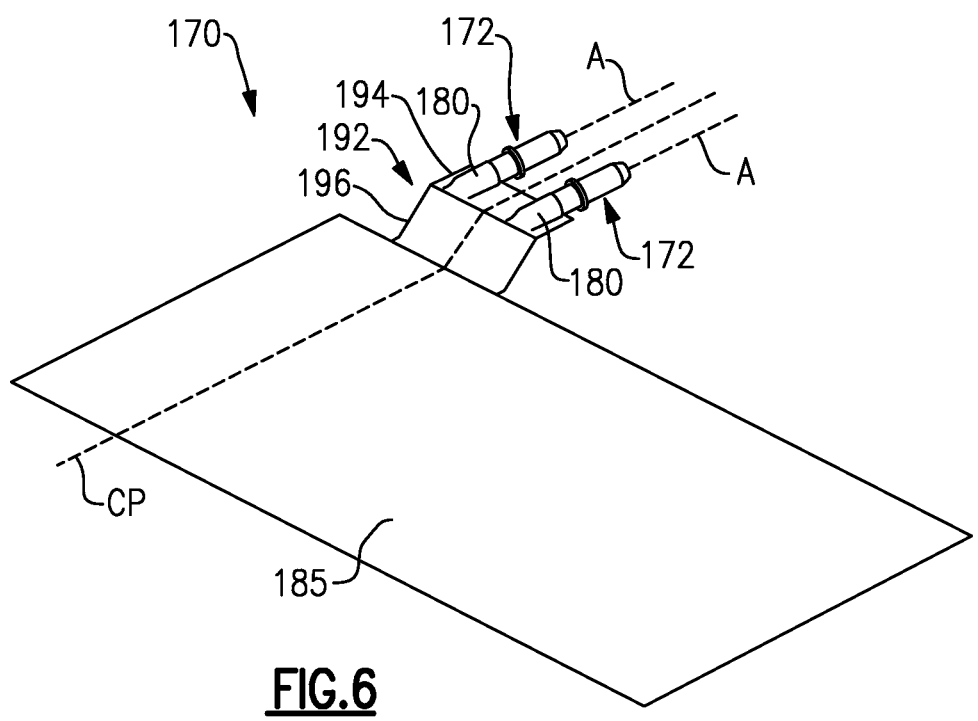
FIG. 6 illustrates a cold plate assembly according to a second embodiment of this disclosure.

FIG. 6 illustrates another exemplary cold plate assembly 170. In this disclosure, like reference numbers designate like elements where appropriate and reference numerals with the addition of 100 or multiples thereof designate modified elements that are understood to incorporate the same features and benefits of the corresponding original elements.

In the exemplary embodiment of FIG. 6, the cold plate assembly 170 includes a body 185 and tubing 172 that may be received by a portion of the body 185 for attachment thereto. The body 185 may be constructed of one or more plate pieces. In one embodiment, an extension 192 extends from the body 185. The tubing 172 may be received within flared portions 180 of the extension 192.

In one non-limiting embodiment, the extension 192 includes a platform 194 and a bridge 196 that connects between the body 185 and the platform 194. The bridge 196 may be angled to elevate the platform 194 relative to the body 185. The flared portions 180 may be formed on the platform 194 of the extension 192 such that the tubing extends along a linear axis A that is elevated above the body 185. In another non-limiting embodiment, a cross-sectional path CP that extends through the body 185 and the extension 192 is Z-shaped.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An assembly, comprising:
 a top plate piece;
 a bottom plate piece;
 tubing sandwiched between said top plate piece and said bottom plate piece, said tubing included a flange adapted to limit an insertion distance of said tubing between said top plate piece and said bottom plate piece;
 each of said top plate piece and said bottom plate piece includes flared portions that overlap said tubing; and
 said flared portions include tapered inner walls that limit said insertion distance.

2. The assembly as recited in claim 1, wherein portions of both said top plate piece and said bottom plate piece overlap said tubing.

3. The assembly as recited in claim 1, wherein said tubing extends along a linear axis away from an edge of said assembly.

4. The assembly as recited in claim 3, wherein said linear axis extends between said top plate piece and said bottom plate piece.

5. The assembly as recited in claim 1, wherein said top plate piece and said bottom plate piece cooperate to establish a body of a cold plate assembly.

6. The assembly as recited in claim 5, comprising an extension that extends from said body, said tubing received by said extension.

7. The assembly as recited in claim 1, wherein said top plate piece includes a first flared portion and said bottom plate piece includes a second flared portion, said tubing received within an opening between said first flared portion and said second flared portion.

8. The assembly as recited in claim 1, comprising a passage formed between said top plate piece and said bottom plate piece.

9. The assembly as recited in claim 8, wherein said passage is a serpentine passage.

10. The assembly as recited in claim 8, wherein a portion of said tubing that is received between said top plate piece and said bottom plate piece extends along a linear axis that is parallel with at least a portion of said passage.

11. The assembly as recited in claim 1, wherein said tubing includes an inlet tube and an outlet tube.

12. An assembly, comprising:
 a top plate piece;
 a bottom plate piece;
 tubing sandwiched between said top plate piece and said bottom plate piece, said tubing included a flange adapted to limit an insertion distance of said tubing between said top plate piece and said bottom plate piece,
 wherein said top plate piece and said bottom plate piece cooperate to establish a body of a cold plate assembly; and
 an extension extends from said body, and said tubing is received by said extension,
 wherein said extension includes a platform connected to said body by a bridge, said platform elevated relative to said body.

13. An assembly, comprising:
 a top plate piece;
 a bottom plate piece;
 tubing sandwiched between said top plate piece and said bottom plate piece, said tubing included a flange adapted to limit an insertion distance of said tubing between said top plate piece and said bottom plate piece;
 said top plate piece and said bottom plate piece cooperate to establish a body of a cold plate assembly; and
 a bridge that extends at a transverse angle between said body and a platform, said tubing received by said platform.

14. The assembly as recited in claim 13, wherein a cross-sectional path that extends through said body, said bridge, and said platform is Z-shaped.

* * * * *